United States Patent
Rake (10) Patent No.: US 6,932,856 B2
(45) Date of Patent: *Aug. 23, 2005

(54) APPARATUS AND METHOD FOR LUBRICANT CONDITION CONTROL AND MONITORING FROM A REMOTE LOCATION

(75) Inventor: Brad Rake, Hubertus, WI (US)

(73) Assignee: Trico Mfg. Corp., Pewaukee, WI (US)

(*) Notice: Subject to any disclaimer, the term of this patent is extended or adjusted under 35 U.S.C. 154(b) by 381 days.

This patent is subject to a terminal disclaimer.

(21) Appl. No.: 10/197,642

(22) Filed: Jul. 17, 2002

(65) Prior Publication Data

US 2003/0075043 A1 Apr. 24, 2003

Related U.S. Application Data

(63) Continuation-in-part of application No. 09/670,852, filed on Sep. 27, 2000, now Pat. No. 6,447,573, which is a continuation-in-part of application No. 09/457,026, filed on Dec. 8, 1999.

(51) Int. Cl.[7] .............................................. B01D 53/02
(52) U.S. Cl. ................................ 95/10; 96/111; 96/407; 96/417; 184/6.21; 184/6.24
(58) Field of Search ............................... 95/10; 96/111, 96/417, 407; 34/407, 449, 448, 517; 184/6.4, 6, 7.4, 6.21, 6.24, 108

(56) References Cited

U.S. PATENT DOCUMENTS

| | | |
|---|---|---|
| 539,117 A | 5/1895 | Busch |
| 779,357 A | 1/1905 | Gardner |
| 992,503 A | 5/1911 | Howard |
| 1,113,276 A | 10/1914 | Woodmausee |
| 1,571,495 A | 2/1926 | Smith |
| 1,600,262 A | 9/1926 | Wickham |
| 1,610,283 A | 12/1926 | Hill |
| 1,688,279 A | 10/1928 | Loeke |
| 1,864,195 A | 6/1932 | Hall |
| 2,227,646 A | 1/1941 | Hillman |
| 2,340,455 A | 2/1944 | Davis |
| 2,376,623 A | 5/1945 | Romberg |
| 2,589,081 A | 3/1952 | Hertz |
| 2,608,993 A | 9/1952 | Andrews |
| 2,930,432 A | 3/1960 | Engstrom |
| 2,995,213 A | 8/1961 | Gross |
| 3,338,262 A | 8/1967 | Chopelin |

(Continued)

OTHER PUBLICATIONS

Pall Water Sensor: An essential tool for fluid condition monitoring; Pall Corporation sales literature, not dated.

(Continued)

*Primary Examiner*—Duane S. Smith
(74) *Attorney, Agent, or Firm*—Ryan Kromholz & Manion, S.C.

(57) ABSTRACT

An air or oil dryer module is provided to remove or reduce moisture from a lubricant using a pressurized air supply to inject dry air into a lubricant sump. As the "dry air" or air with a minimized moisture content, gathers moisture from the lubricant a relative humidity sensor detects an increase in air moisture. At a pre-determined relative humidity level, a fresh supply of air is added into the lubricant sump, purging the higher relative humidity level air from the sump. A method of reducing moisture content of a lubricant contained in an enclosed space is also disclosed and is performed by agitating the lubricant, providing a humidity sensor in fluid communication with the enclosed space, measuring the humidity of the enclosed space and comparing the humidity measurement with a pre-selected humidity level, introducing dry air into the enclosed space if the humidity level equals or exceeds the pre-selected humidity level, until the saturated humidity level is less than the pre-selected humidity level.

30 Claims, 9 Drawing Sheets

U.S. PATENT DOCUMENTS

| | | | |
|---|---|---|---|
| 3,447,562 A | | 6/1969 | Hoffman |
| 4,105,092 A | * | 8/1978 | Zeidler et al. |
| 4,345,668 A | | 8/1982 | Gaunt |
| 4,445,168 A | | 4/1984 | Petryszyn |
| 4,681,189 A | * | 7/1987 | Krisiloff |
| 4,738,336 A | | 4/1988 | Smith et al. |
| 4,990,057 A | | 2/1991 | Rollins |
| 5,060,760 A | | 10/1991 | Long et al. |
| 5,080,195 A | | 1/1992 | Mizumoto et al. |
| 5,101,936 A | * | 4/1992 | Paredes et al. |
| 5,125,480 A | * | 6/1992 | Gregory et al. |
| 5,197,569 A | | 3/1993 | Roessler et al. |
| 5,203,680 A | | 4/1993 | Waldrop |
| 5,271,528 A | | 12/1993 | Chien |
| 5,273,134 A | | 12/1993 | Hegemier et al. |
| 5,318,152 A | * | 6/1994 | Ehlert |
| 5,332,064 A | | 7/1994 | Liu |
| 5,381,874 A | | 1/1995 | Hadank et al. |
| 5,542,499 A | * | 8/1996 | Westermeyer |
| 5,568,842 A | * | 10/1996 | Otani |
| 5,634,531 A | | 6/1997 | Graf et al. |
| 5,671,825 A | | 9/1997 | Wong et al. |
| 5,806,630 A | * | 9/1998 | Bernal |
| 5,816,212 A | * | 10/1998 | Lindquist et al. |
| 6,273,031 B1 | * | 8/2001 | Verdegan et al. |
| 6,447,573 B1 | * | 9/2002 | Rake |

OTHER PUBLICATIONS

Environmental Solutions for the Military: Pall Portable Purifier, Pall Corporation web site address: www.pall.com/environ/military/solutions/products/purifier.html.

Measuring Moisture in Liquids: A New Methods, *Sensors*, Dec. 1996 pp. 42–47.

Sensor Mediated In Situ Measurement of Moisture In Organic Liquids, Phys–Chem Scientific Corp. sales liturature, not dated.

Hydraulic and Lubrication Systems Solutions: Water Sensor—An esential tool for fluid condition monitoringPall Corporation sales literature, not dated.

* cited by examiner

APPARATUS AND METHOD FOR LUBRICANT CONDITION CONTROL AND MONITORING FROM A REMOTE LOCATION

RELATED APPLICATION

This application claims the benefit of and is a continuation-in-part of application Ser. No. 09/670,852 now U.S. Pat. No. 6,447,573 filed on 27 Sep. 2000, which is a continuation-in-part of Ser. No. 09/457,026 filed on 8 Dec. 1999.

BACKGROUND OF THE INVENTION

Lubrication is an important aspect of maintaining machinery in proper operating condition. Machine elements such as bearings, journals, shafts, and joints require proper lubrication between their moving surfaces to decrease friction, prevent contamination, reduce wear and dissipate heat. Improper lubrication is likely to lead to premature component wear and component or system failure.

When determining the optimal lubrication between moving machine elements, many factors should be considered. These factors include the mode of operation of the machine, the type of machine element to be lubricated, the environment of the machine, the operating speed of the machine, the lubricant's viscosity, the lubricant's temperature, the lubricant's ingredients, and the lubricant's condition.

Prior art lubricators, such as the TRICO OptoMatic oiler, supply a constant level of lubricant within a lubricant reservoir to a machine element. The lubricant level is predetermined for the particular application and cannot be changed during the operating time of the machine to which the constant level lubricator is attached. Although this type of lubricator provides reasonable performance in many steady-state operations, multiple variables can create unacceptable operating conditions and lead to premature wear, or even failure, of machine elements. The variables include "on" and "off" operating modes (machine cycling), oil viscosity, machine speed, lubricant temperature, lubricant condition, and lubricant vessel pressure.

Other devices, such as the TRICO Hydrolert indicate by LED signals the status of the equipment's lubrication such as lubricant condition within acceptable levels, lubricant condition at the upper limit of acceptable levels, and lubricant condition immediate action required. This device is effective because an operator is signaled only when the lubricant condition is at the upper limit of acceptable levels or if immediate action is required. This reduces maintenance costs and productivity is enhanced.

With specific regard to lubricant relative humidity, or saturated relative humidity, one prior form of lubricant qualitative control utilized an in-line water removal filter. Another form of lubricant qualitative control is to dilute the existing amount of lubricant with a fresh supply of lubricant, reducing the overall lubricant moisture content by introducing a portion of lubricant with a lower moisture content. Still another form of moisture removal is to expose the air surrounding the lubricant to a desiccant material that removes humidity from the air.

SUMMARY OF THE INVENTION

The system of the present invention relates generally to the field of lubrication and specifically to the field of devices which deliver a lubricant to a machine element, such as a bearing in a pump.

The system of the present invention provides continual on-line monitoring that eliminates the need for expensive repetitive lubrication checking and time-consuming laboratory oil sampling. Designed for installation on rotating equipment or other lubricant reservoirs, the system of the present invention provides real time information on lubricant variables such as lubricant water content, with the added flexibility of providing real time information and control of other variables such as temperature, viscosity, and particulate matter.

The present invention is directed at lowering lubricant water content to acceptable levels. It has been discovered that moisture removal from oil is an important objective to achieve optimum lubricant condition. Lubricants such as oil have an initial moisture content, and often the initial moisture content is unacceptable. Additionally, harsh machine operating conditions such as pump wash-downs and condensation occurring during changing plant temperature and humidity conditions can contribute to potentially harmful lubricant moisture levels.

If the lubricant is not agitated such as during an off operating mode, a continuous oxygenated layer forms a barrier on top of the lubricant. This oxygenated layer prevents moisture from both entering and leaving the lubricant. When the lubricant is agitated, such as during an "on" equipment operating mode, the oxygenated layer is broken. "Dry" air, or air with moisture significantly removed, assists in withdrawing the moisture from the oil by a continuous moisture equilibrium interaction between the agitated lubricant and the dry air above the lubricant. It has also been found that an increase in dry air temperature increases the rate of moisture removal from the lubricant.

The present volumetric lubricant dispenser controls water content in a lubricant to provide optimum operating conditions and extend the useful life of lubricants. An automatically controlled system is adjusted by means of a microprocessor that receives input from various system sensors and adjusts the lubricant humidity level accordingly through an air drying process, that, in turn lowers the lubricant moisture level. In the automatic mode, the entire system is constantly monitored.

The present volumetric lubricant dispenser is designed to control the water content of lubricant to a rotating element or machine part or other lubricant reservoir. The rotating element may include a bearing or a journal or the combination of the two. In a typical application, a bearing includes an inner and an outer race. Between the races a plurality of rolling elements are positioned, usually balls. If the outer race is attached to the bearing housing, the inner race and the rolling elements are rotated into and out of a lubricant reservoir. The reservoir is maintained within the bearing housing.

For the purpose of qualitative lubricant control, the present invention may be described as a system intended for controlling lubricants, both mineral (natural) and synthetic based, by measuring the condition characteristics of the lubricant, including water or moisture content.

Accordingly, an apparatus for qualitative lubricant condition control and monitoring may include but not be limited to the following illustrative description. The apparatus comprises at least one lubricant condition-sensing module. The module may be of any suitable type for sensing a desired lubricant characteristic; in this case water or moisture content. The lubricant sensing module is communicatively coupled to a qualitative control mechanism. For example, the qualitative control mechanism could be a microprocessor. The qualitative control mechanism is also communicatively coupled to at least one response mechanism, e.g., an air pump or compressor. The qualitative control mechanism is capable of actuating at least one response mechanism in response to a signal received from at least one lubricant condition-sensing module and interpreted by the qualitative control mechanism.

A method of reducing moisture content of a lubricant contained in an enclosed space is also disclosed and is performed by agitating the lubricant, providing a humidity sensor in fluid communication with the enclosed space, measuring the humidity of the enclosed space and comparing the humidity measurement with a pre-selected humidity level, introducing dry air into the enclosed space if the humidity level equals or exceeds the pre-selected humidity level, until the saturated humidity level is less than the pre-selected humidity level.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention in one form comprises a qualitative lubricant condition sensing and control apparatus. The invention is intended to allow flexibility of components based on user preference. For instance, a user may have particular concern for one or more lubricant conditions, such as the lubricant's viscosity, the lubricant's temperature, the lubricant's ingredients, and the lubricant's condition (purity), in addition to the lubricant water saturation or saturated relative humidity ("SRH"). In this sense, the invention is a modular system of interrelated components that are usable together or tailored for specific applications.

For the purpose of the present invention, air drying, oil drying, and lubricant drying are used interchangeably to describe the nature of the desired process and result, because air drying in an enclosed space results in oil or lubricant drying for lubricants in the enclosed space. Also for the purpose of defining the present invention, an agitated lubricant is desired to encourage the lubricant/air moisture equilibrium interaction by preventing formation of the oxygenated barrier on top of the lubricant Two types of humidity readings are relevant to the present invention. The first is "saturated relative humidity" used to describe the water content present in a lubricant. The second is "relative humidity" used to describe the water content present in air contained in an enclosed space containing air and the lubricant.

The lubricant is "agitated" during routine machine operating conditions, such as when the machine is running. Additionally, some machines such as centrifugal pumps may contain internal components such as a "slinger disc" or a "flinger ring" that contribute to or enhance lubricant agitation.

Also for the purpose of defining the invention, a void space in a sump is referred to as an enclosed volume. The enclosed volume is enclosed with respect to the workpiece to define a system that minimizes the introduction of air from the workpiece operating environment such as a pump farm. The enclosed volume, is however, coupled with external elements to which the invention is directed, i.e., an oil drying module and related components.

Figure 1:
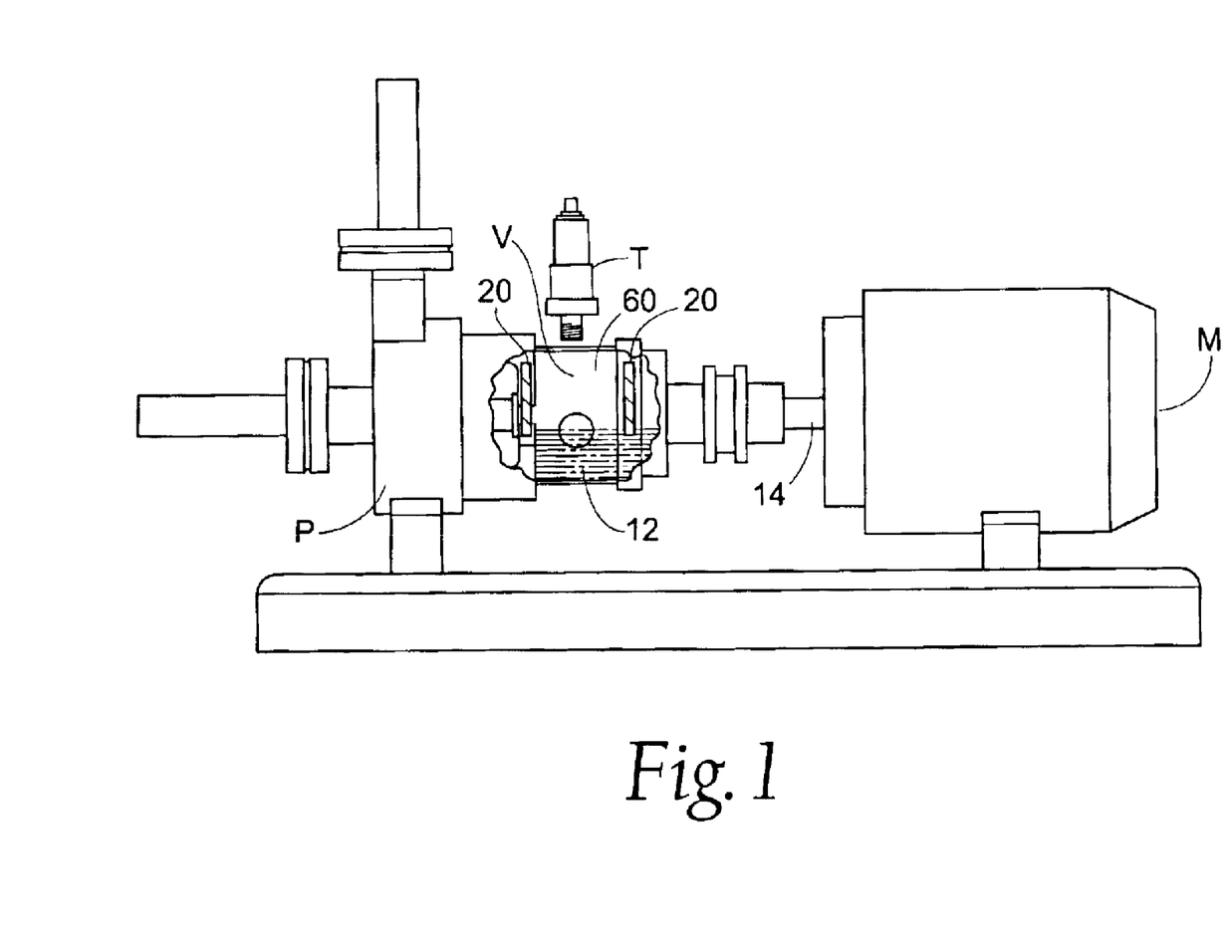
FIG. 1 is a partially cut away front elevational view of the workpiece to which the invention is directed.

The workpiece to which the invention is directed is best shown in FIG. 1, although the invention can be applied in different work environs. In FIG. 1, the workpiece is shown as a centrifugal pump P with a motor M. The invention provides an optimal lubrication condition to machine element or bearings 20 by minimizing the relative humidity of the air surrounding the bearings 20, also decreasing the percent saturation of water in lubricant 12, such as oil. In FIG. 1, the bearings 20 are viewed from the side, with their front profile generally doughnut shaped. The lubricant 12 is contained within a fluid reservoir, or bearing housing 60. Typically, two bearings 20 are located within the bearing housing 60. Bearing 20 includes an inner race, an outer race, and a plurality of rolling ball elements positioned between inner race and outer race (not shown). In order for bearing 20 to perform its function of maintaining a low friction precision relationship between a rotating element or shaft 14 and bearing housing 60, the bearing 20 must operate in an environment where it receives proper lubrication.

To achieve proper lubrication, bearing housing or reservoir 60 is filled with a predetermined amount of lubricant 12. When the machine, of which bearing 20 is a component, is in a static state, the amount of lubricant 12 within the housing 60, the pressure of the lubricant 12, the distribution of the lubricant 12 within the housing 60, and the temperature of the lubricant 12 are constant.

It has been discovered that moisture removal from oil is an important objective to achieve optimum lubricant condition. Lubricants such as oil have an initial moisture content. If the lubricant 12 is not agitated and is in a static state, such as during an off operating mode, a continuous oxygenated layer forms a barrier on top of the lubricant 12. This oxygenated layer prevents moisture from both entering and leaving the lubricant 12.

Once the machine is set in motion and journal 14 begins to rotate, the lubricant's characteristics begin to change.

These characteristics can continue to change during the run cycle of the machine. When the lubricant 12 is agitated, such as during an on operating mode, the oxygenated layer is broken, facilitating and allowing the removal of moisture from the lubricant 12, in addition to allowing the introduction of moisture to the lubricant 12 from air contained in the enclosed void space V.

Figure 8:
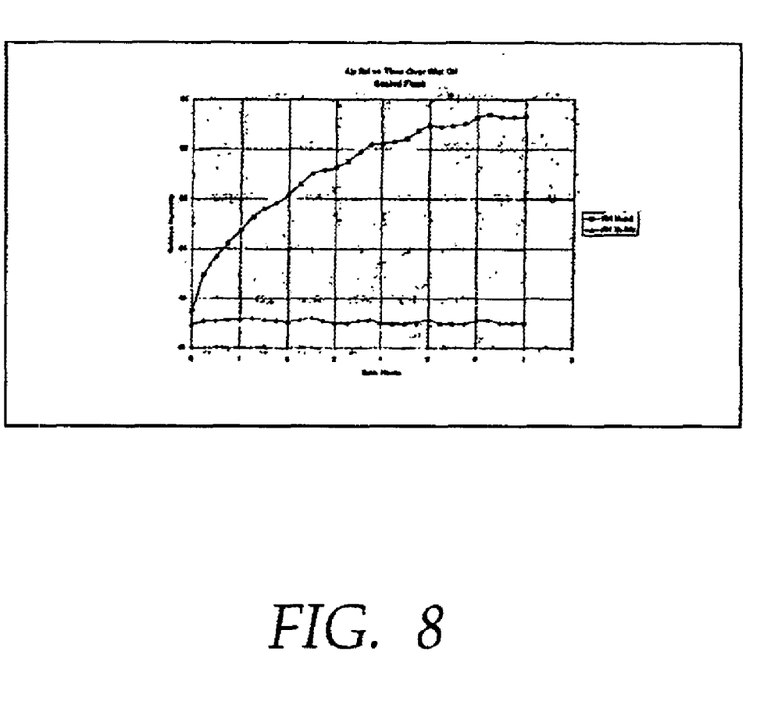
FIG. 8 shows a table of the relationship between humidity removal in a static state and an agitated state.

FIG. 8 demonstrates the enhancing effects of agitation on moisture removal from a lubricant. A seven (7) hour test was conducted with air relative humidity levels measured every fifteen (15) minutes on two sealed flasks containing identical volume and type of lubricant. The first flask remained static and undisturbed throughout the test. The second flask was slightly agitated throughout the test to simulate pump operating conditions. Both flasks contained an initial relative humidity in the air of approximately 43%. As FIG. 8 shows, the relative humidity in the air of the agitated flask gradually increased throughout the test, while the relative humidity in the air of the static flask remained virtually constant. The rise in the relative humidity in the air of the agitated flask demonstrates the release of saturated relative humidity from the lubricant into the air by the continuous moisture equilibrium interaction between the agitated lubricant and the dry air above the lubricant. The air above the lubricant acts as a sink for the saturated relative humidity from the lubricant.

Figure 2:
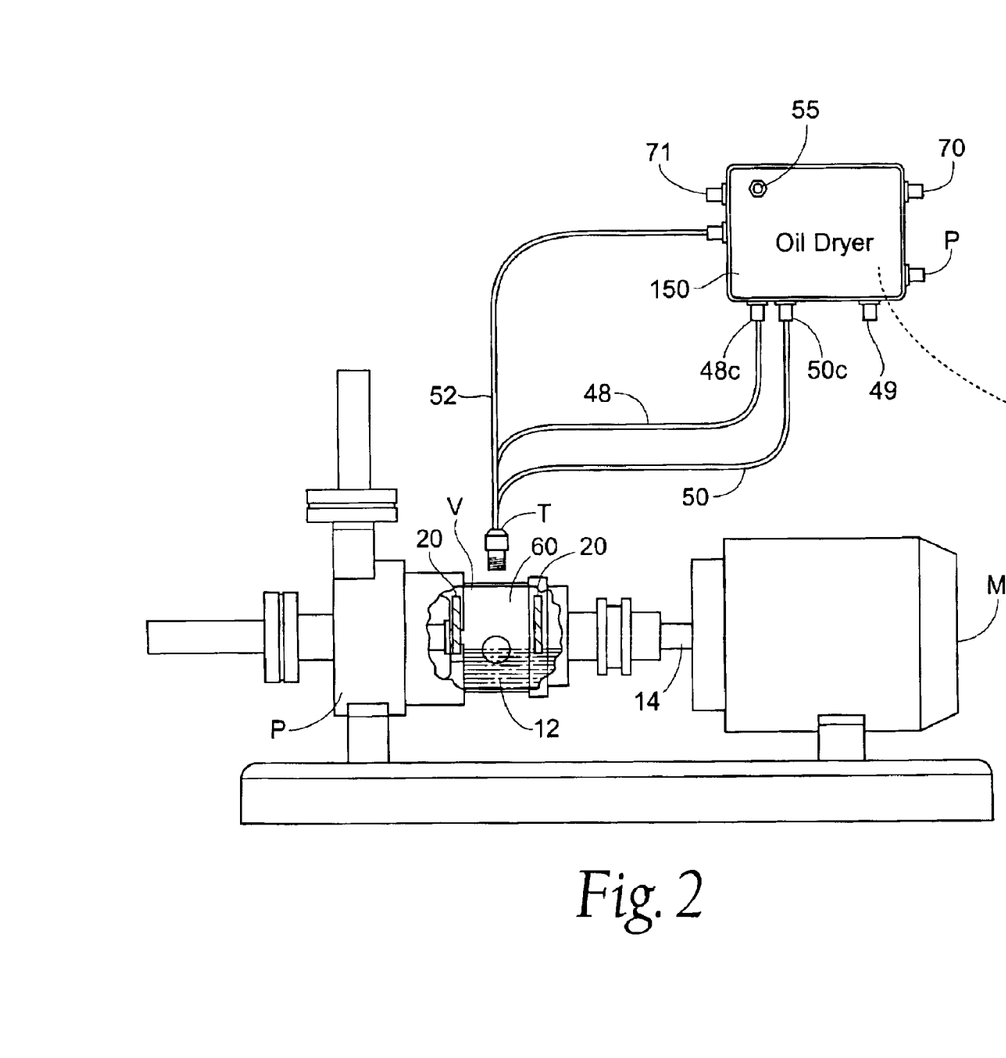
FIG. 2 is a schematic view of an oil dryer module and transducer communicatively coupled with the workpiece.

Referring now to FIG. 2, an oil dryer module 150 is shown positioned to be communicatively coupled with the void space V on the workpiece. The oil dryer module 150 is capable of receiving electric signals from a transducer T. If the transducer T detects a humidity reading above a predetermined level, the transducer T sends a signal to the oil dryer module 150 through electrical circuitry as described later. In response to a humidity reading above the predetermined level, the oil dryer module 150 initiates air removal from the void space V, and also alternatively illuminates an LED 55 to signal elevated humidity levels.

Removed air enters the oil dryer module 150 from an air intake line 48 coupled with an air intake coupling 48C. The oil dryer module 150 then compresses the air with an air compressor 25 as shown on FIG. 2B, removes the moisture from the air, and returns the dried air to the void space V, as described later. The extracted moisture leaves the oil dryer module 150 from the drain port 49, where the water can be captured by a receptacle (not shown). The dried air is returned to the void space V through an air-out coupling 50C and an air-out line 50, communicatively coupled with the void space V.

Referring to FIG. 2, the oil dryer module 150 is equipped with an indicating mechanism 55, such as an LED that can indicate visually whether an alarm condition, or an RH reading above a pre-selected level. In addition to the visual indication of an alarm condition through the LED indicator 55, the oil dryer module 150 is equipped with a dry contact alarm output 70 and an electrical output 71 intended for coupling with a computer (not shown) for data storage and analysis. Additionally, the oil dryer module 150 is provided with power through the power inlet P.

Figure 2A:
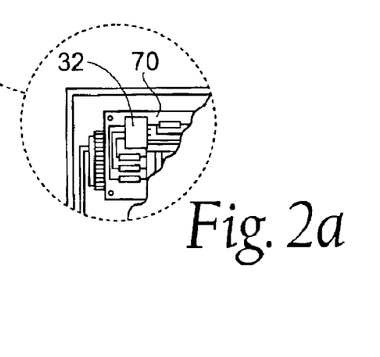
FIG. 2A is a partially cut away view of portions of an oil dryer module supplying logic to the oil dryer module.
Figure 2B:
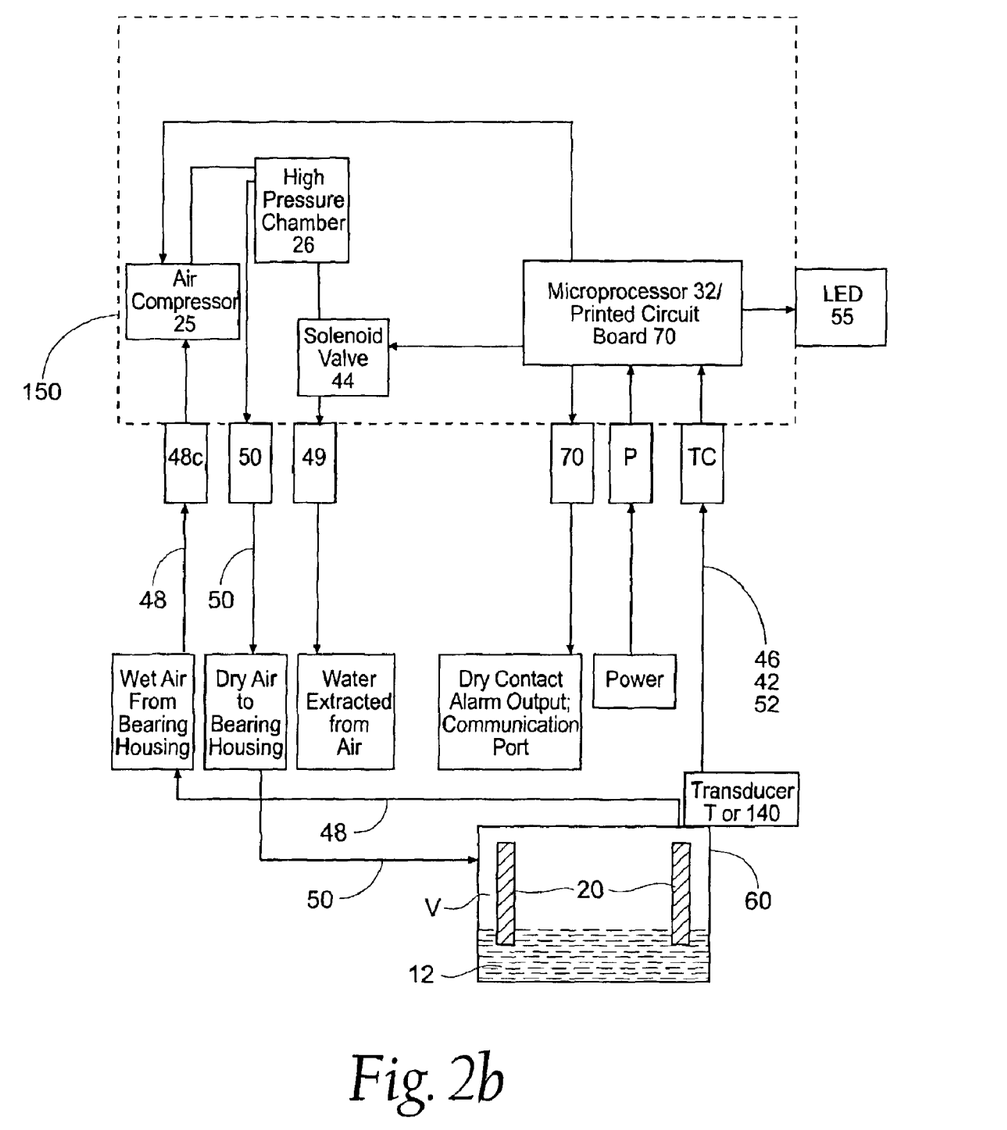
FIG. 2B is a schematic view of an oil dryer module.

In the embodiment shown in FIGS. 2 and 2A and 2B, the oil dryer module 150 is internally controlled by a printed circuit board 70 for providing signals to actuate the solenoid valve 44 and the air compressor 25. The transducer T provides an input to the printed circuit board 70, which contains a controller or microprocessor 32. The air compressor 25 is controlled by an output of the printed circuit board 70. When the transducer T feeds input into the microprocessor 32 of the printed circuit board 70 indicating an air moisture condition at or above the pre-selected limit, the microprocessor 32 sends a signal to actuate the air compressor 25 and a solenoid valve 44, which in combination purges the wet air and replaces the wet air with dry air. The microprocessor 32 simultaneously sends a signal to the LED 55, illuminating the LED. The dry air is pumped and circulated through the void space V until the predetermined humidity and/or temperature levels are reached, which indicate that the lubricant has, again, reached the desired level of humidity or temperature.

Referring now to FIG. 2B, a small air compressor is housed within the oil dryer module 150 to force air through the air-in line 48 and thus the air-out line 50. The air exchange is a closed-loop purge with the air-in line 48 and the air-out line 50 in fluid communication with the same void V. The air compressor 25 controls the flow of dry compressed air into the sump void space V by drawing wet air from the void space V and replacing the wet air with dry air. From the air compressor 25, the wet air enters into a high pressure chamber 26, where the wet air is condensed and separated into air and water components. At a predetermined level, the microprocessor 32 opens the solenoid valve, allowing the moisture to leave the oil dryer module 150 for capture in a receptacle (not shown). The amount of water captured in the receptacle is available for measurement and data trending to show efficacy or problem pumps. The dried air is returned to the void space V through the air-out line 50.

Although the system depicted in FIG. 2B shows a closed-loop air drying system, with the air from the void space V dried and then returned to the void space V, an open-loop air drying system (not shown) would be preferable for larger scale oil drying projects. In an open-loop air drying system embodiment, the wet air from the void space V would be expelled from the void space V by the introduction of dry air from an external source, such as "shop air" or air from a plant air compressor. The microprocessor 32 would initiate air introduction from the shop air source until the humidity level in the void space V falls below the pre-determined level. In this embodiment, the wet air from the void space V is not withdrawn and subsequently condensed and separated, but is instead purged and replaced with the introduction of dry shop air. Another alternative to shop air is the addition of other gases, such as nitrogen, to reduce the relative humidity and thus the saturated relative humidity.

Figure 3:
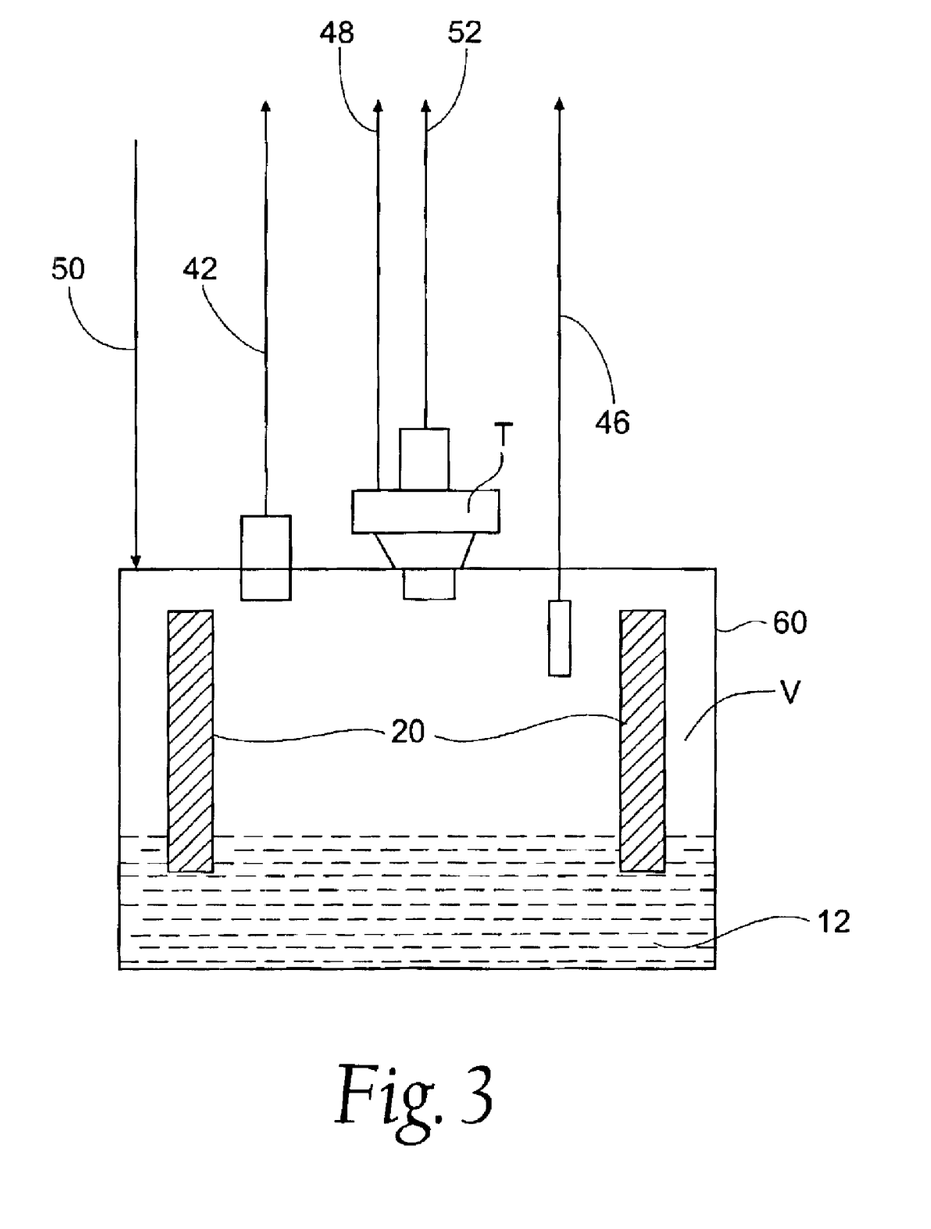
FIG. 3 is a schematic view of an air dryer sensor system applied to a lubricant sump containing lubricant.

Referring now to FIGS. 2 and 3, as pictured in FIG. 2, the transducer T refers collectively to an RH sensor 50, a temperature sensor 46, and their respective electrical couplings with the oil dryer module 150, although the temperature sensor 46 is not required. Comparing FIGS. 2 and 3, in FIG. 3, the RH sensor 42, temperature sensor 46, and a transducer electrical line 52, used to communicate with the oil dryer module 150 are pictured as entering the void space V individually. However, as pictured in FIG. 2, it is preferable to bundle the elements together to minimize connections as designated by the transducer T. One convenient way to communicatively couple the transducer T with the void space V is through threaded connections. However, any known coupling mechanism capable of withstanding a hot and oily work environment could perform suitably.

Referring now to FIG. 3, the RH sensor 42 measures the humidity of the air in the equipment housing or sump void space V. Preferably, the RH sensor 42 is not submerged in the lubricant, but instead measures the humidity in the air, although the RH sensor 42 could be submerged in the lubricant and perform suitably. The RH sensor 42 collects the humidity information and converts it into electrical signals, which the microprocessor 32 may then utilize in association with a predetermined microprocessor program as fully described in co-pending application Ser. No. 09/457, 026 incorporated herein by reference. The use of the temperature sensor 46 is preferable to most precisely correlate the reading from the RH sensor 42, although un-correlated data could also perform suitably.

The RH sensor 42 measures the relative humidity of the air at predetermined intervals utilizing a timer (not shown). While it is presently believed best to measure humidity at predetermined intervals, humidity could be measured continuously in a stream of data, e.g., in an analog type system.

One RH sensor 42 that has been found to perform suitably is a Model EMD 2000 humidity sensor of the type sold by General Eastern, a Banthorpe PLC Company, located at 20 Commerce Way, Woburn, Mass. 01801-1057.

In its commercially preferred form the RH sensor 42, through the microprocessor 32 is capable of turning on or off indicating mechanism 55, e.g., a light or LED, when a predetermined safe level of humidity is present. The sensing mechanism 55 is also capable of switching the monitored equipment on or off at a predetermined control point or other set condition indicating acceptable humidity condition.

Alarm operating mode is indicated by a red light. This indicates the lubricant is at high moisture levels for optimum lubricant performance and protection. During this mode the oil humidity is greater than or equal to the pre-selected humidity reference.

Again comparing FIGS. 2 and 3, the air-in line 48 and air-out line 50 can be coupled with the sump at any location above the level of the lubricant 12 in the reservoir 60. However, it is preferable to have the air-out line 50 positioned near the transducer T. This positioning provides a more accurate humidity reading to the transducer T because the withdrawal of wet air from the void space V would lead the wet air past the transducer T. This avoids the potential of the transducer T measuring air freshly returned from the oil dryer module 150, which would provide a humidity reading dryer than the overall humidity level within the void space V.

Figure 4:
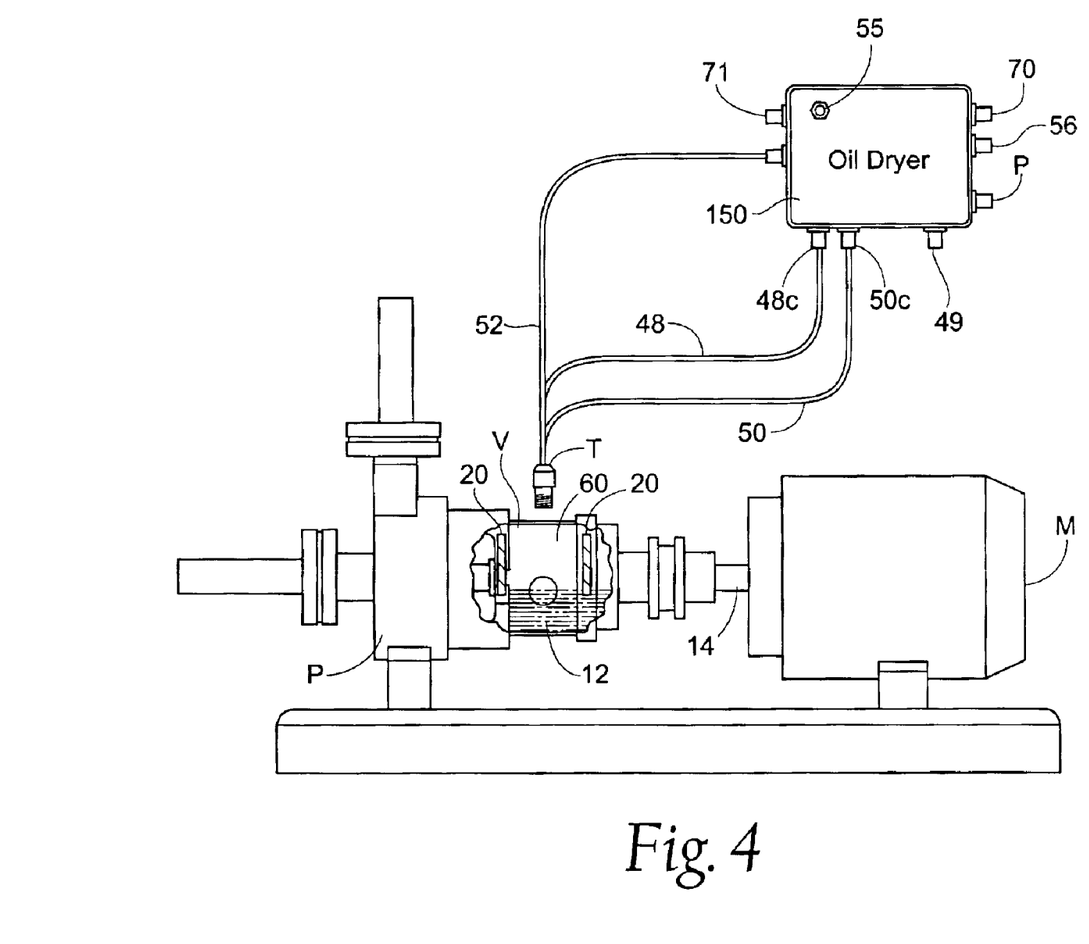
FIG. 4 is a schematic view of an oil dryer module and transducer communicatively coupled with the workpiece, the oil dryer module further comprising a controller and a communication output and input port.

Referring now to FIG. 4, an alternative embodiment of the oil dryer module 150 is shown. In this embodiment, the oil dryer module 150 is additionally equipped with a communications port 56, which can comprise a commonly available communications port such as a BUS port.

Figure 5:
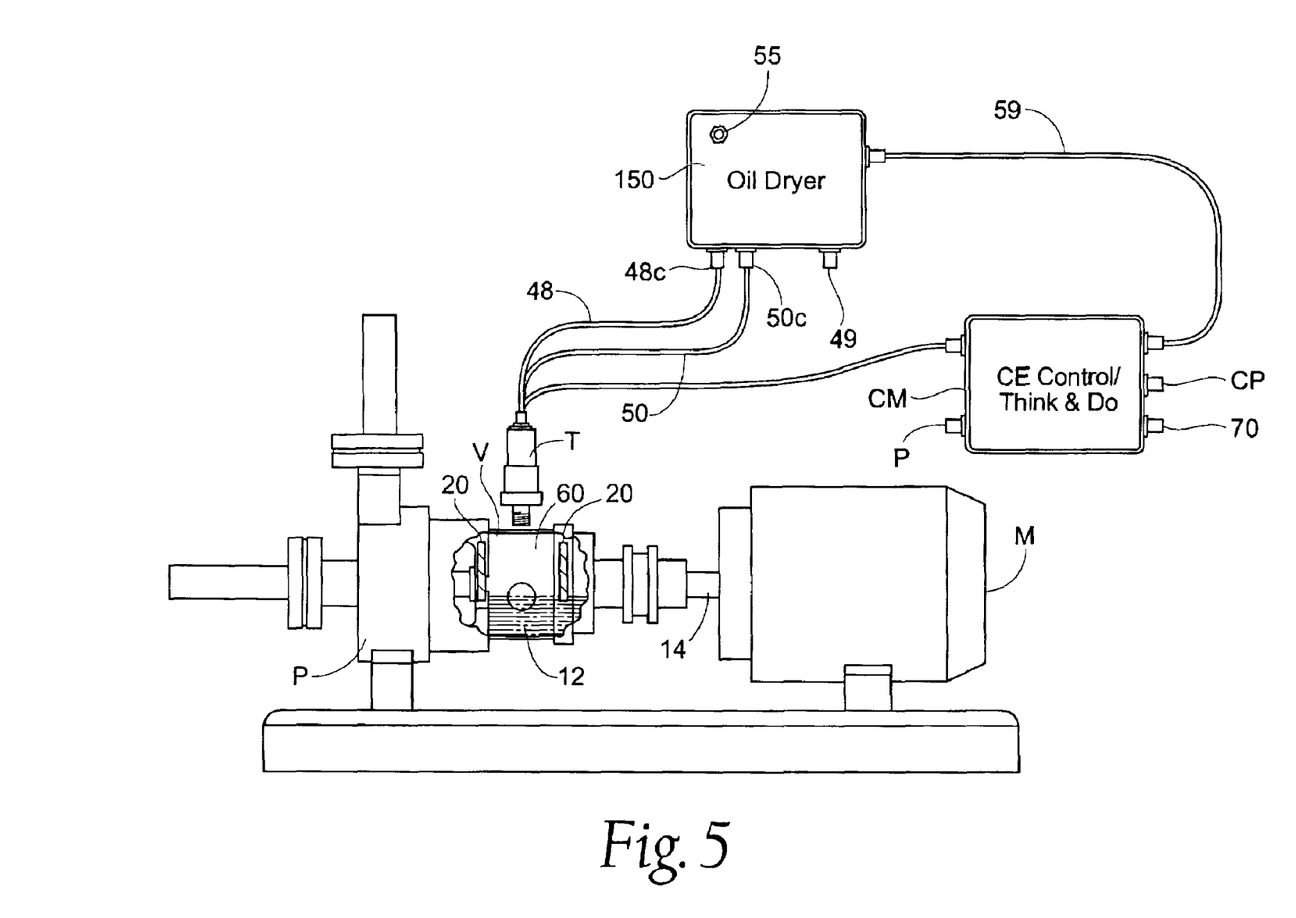
FIG. 5 is a schematic view of an oil dryer module and transducer communicatively coupled with the workpiece, with a CE control module in-line.

Referring now to FIG. 5, a second alternative embodiment is shown. In this embodiment, the oil dryer module 150 and transducer T are communicatively coupled with a CE control module CM in-line. In this embodiment, the oil dryer module 150 is not internally controlled as described above, but is externally controlled by the CE control module CM. This embodiment adds flexibility to the oil drying system to allow monitoring and control of additional lubricant variables such as viscosity, power, and vibration.

In this embodiment, the transducer T is coupled with the CE control module CM. The CE control module CM is supplied with a network communications port CP for connection to a remote network (not shown). A dryer driver cable 59 communicatively couples the CE control module CM with the oil dryer module 150.

Figure 6:
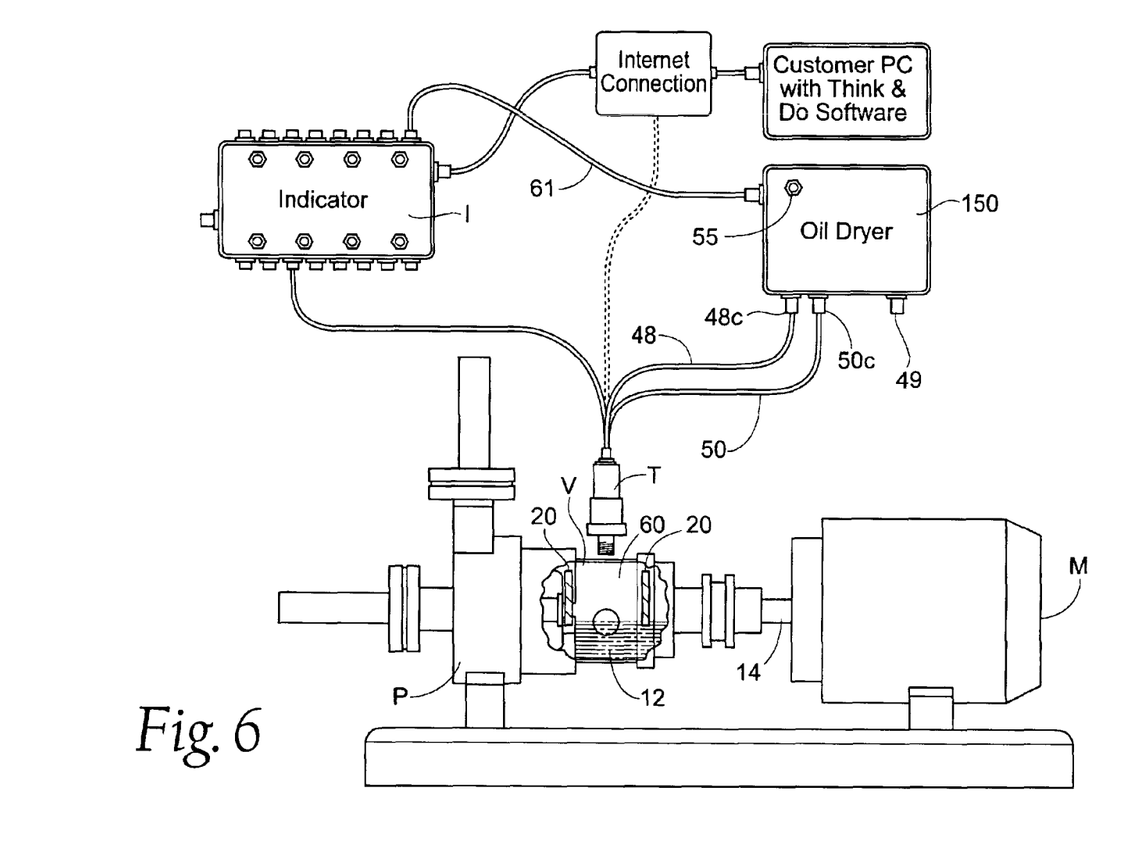
FIG. 6 is a schematic view of an oil dryer module and transducer communicatively coupled with the workpiece, with an indicator module in-line, the indicator module communicatively coupled with an external computer.

Referring now to a third alternate embodiment as shown in FIG. 6, the oil dryer module 150 and transducer T are communicatively coupled with the workpiece, with an indicator module I in-line, the indicator module I communicatively coupled with a remote computer (not shown). In this embodiment, the oil dryer module 150 is controlled by the remote computer, with the control and transducer T signals carried through the indicator I, and to the oil dryer module 150 and remote computer as necessary. The communication between the indicator module I and the remote can be can be accomplished through numerous mechanisms, such as a common BUS port and cable arrangement as shown. An oil dryer cable 61 communicatively couples the indicator module I with the oil dryer module 150.

Figure 7:
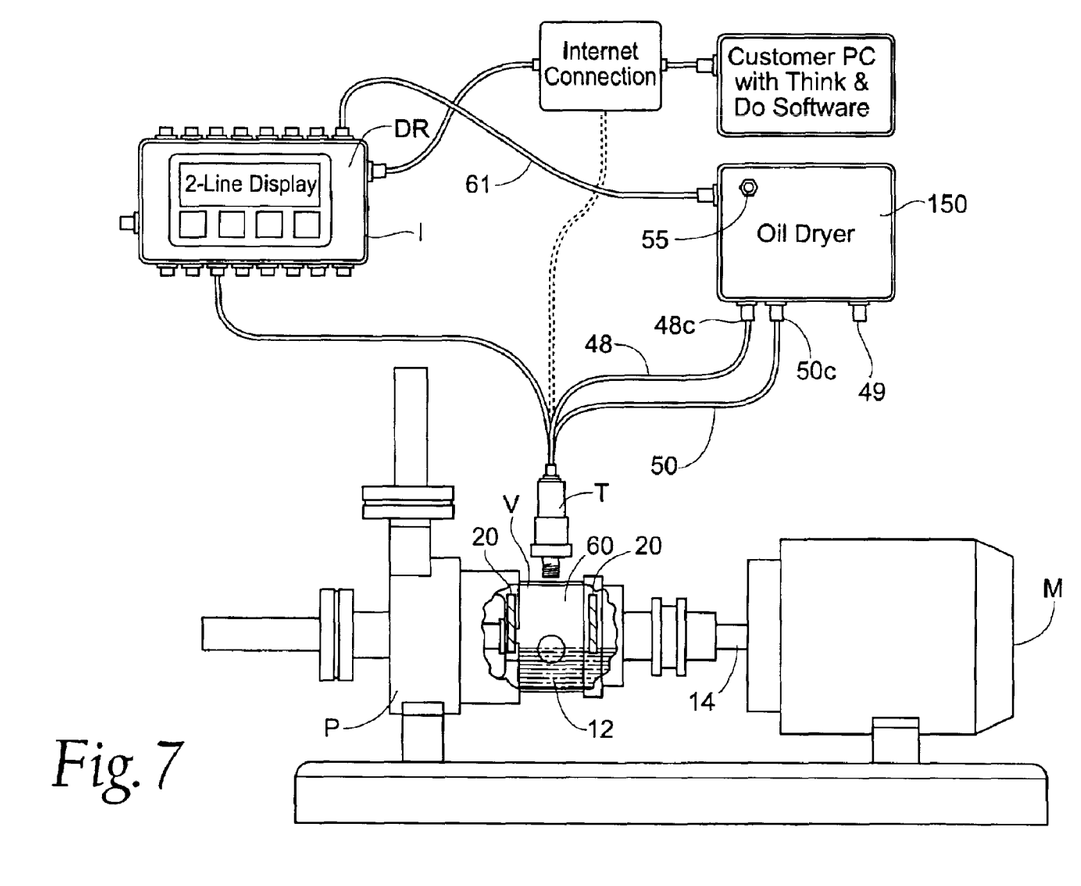
FIG. 7 is a schematic view of an oil dryer module and transducer communicatively coupled with the workpiece, with a digital readout indicator module in-line, the digital readout indicator module communicatively coupled with an external computer.

A preferable communication would be through the internet as shown in FIGS. 6 and 7, whereby a personal computer receives information from the remote location. Although in FIG. 6 the remote location is labeled as a "Customer PC with Think & Do Software" the present invention is envisioned either as a method of providing a monitoring service to a customer, or a method of allowing a single computer to remotely control a plurality of indicators, or the apparatus for accomplishing the methods.

As shown in FIG. 6, the transducer T can be directly connected to the internet connection, or indirectly connected to the internet connection. In an indirect connection, the transducer T would first send its signal to the indicator module I or another component (not shown) between the transducer T and the internet connection. Alternatively, transducer T could send its signal to a computer connected to the internet for further transmission through the internet to a remote computer providing a monitoring and/or controlling service. In a direct connection, transducer T would send its signal directly through the internet.

Further, although the embodiment shown in FIG. 6 is shown with a single oil dryer connected to a single workpiece, such as pump P having motor M, it is recognized that a single remote control device such as the Customer PC with Think & Do Software could control a single oil dryer 150 coupled to multiple devices, or multiple oil dryers 150 coupled to multiple devices. It is also recognized that multiple Customer PCs with Think & Do Software could control a single oil dryer 150 coupled to multiple devices, or multiple oil dryers 150 coupled to multiple devices.

This embodiment also adds flexibility to the oil drying system to allow monitoring and control of additional lubricant variables such as viscosity, power, and vibration. With the additional viscosity, power, and vibration, the user can then operate the remote computer to provide valuable lubricant information and correlation for prediction for multiple devices, such as in a pump farm. The remote computer can be used for data storage, trending, and oil dryer module 150 control. The user can analyze this information to detect trouble machinery or machinery in need of repair or replacement, and to predict maintenance. For instance, if a particular piece of machinery within a larger pump farm is requiring more frequent lubricant control, that piece of machinery, the data trending could indicate possible trouble machinery.

Additionally, the use of indicator module I can facilitate indication and control for a plurality of oil dryer modules 150 deployed on a plurality of workpieces. For instance, as shown in FIG. 6, the indicator module I has 8 ports for facilitating 8 oil dryer modules 150 deployed on 8 workpieces. Thus, the indicator module I acts as a central coupling hub between the oil dry modules 150 and the remote computer.

If a temperature sensor is deployed, the sensor monitors the temperature of the lubricant. A bearing operating in an poorly lubricated environment will dissipate excess heat generated by the bearing into the lubricant. If the lubricant begins to break down, it cannot properly perform its function of providing a reduced friction substrate between the bearing components and dissipating heat away from the bearing. If the lubricant temperature exceeds a known level, the microprocessor 32 signals drive motor 100 to add more lubricant to the bearing housing 60. The additional lubricant 12 helps to rejuvenate the present lubricant and helps to dissipate excess heat.

If a vibration sensor is employed, the vibration sensor monitors the vibration of bearing housing 60. Again, improper lubrication of bearing 20 may result in a vibration in excess of a preset maximum vibration level. When the maximum vibration level is exceeded, sensor 140 sends a signal to the microprocessor 32 whereby additional lubricant 12 is again added to the bearing housing 60. The additional lubricant 12 dissipates the vibrational energy through a larger volume of lubricant 12.

If a pressure sensor is employed, the pressure sensor constantly monitors the lubricant pressure within bearing housing 60. If the pressure falls below a predetermined setting, improper lubrication of bearing 20 is likely to occur. In this situation, the microprocessor 32 would send a signal to the drive motor thereby adding more lubricant 10 to the bearing housing 60, increasing the lubricant level, and increasing the lubricant pressure above the required minimum.

Additionally, any level sensor, such as an elastohydrodynamic (EHD) sensor may be added to the present invention to provide a signal to indicate if lubricant should be added or subtracted from the bearing housing 60.

The relevant aspects of sensing and control are fully described in co-pending application Ser. No. 09/457,026 now Pat. No. 6,447,573 and incorporated herein by reference. One skilled in the art will readily appreciate that the air purging cycle of the present invention can be controlled through the alarm sequence of co-pending application Ser. No. 09/457,026 now U.S. Pat. No. 6,447,573.

Referring now to a fourth alternate embodiment as shown in FIG. 7, the oil dryer module 150 and transducer T are again communicatively coupled with the workpiece, with the indicator module I in-line, the indicator module I communicatively coupled with the remote computer (not shown), such as a personal computer. In this embodiment, the indicator module I is equipped with digital readout indicator module DR in-line, the digital readout indicator module DR communicatively coupled with the external computer. The digital readout DR can display a pre-selected lubricant condition parameter such as an analog RH readout. This value is also relayed to the remote computer.

The mechanisms described herein allow for the collection of data and the storage of that data in a memory system for future reference. Also, the stored data can be used to identify situations that are not desirable when data is indicating a trend toward undesirable conditions so those problems may be identified before they occur. The data may be made available for use by algorithms (computer programs) programmed into the microprocessor. The data may also be provided to a user via means of a read out structure so that the user may use a look-up table or other predetermined reference material and then make an appropriate condition monitoring decision regarding the lubricant.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method of reducing saturated relative humidity of a lubricant in an enclosed space also containing air comprising:

provideing a humidity sensor in fluid communication with the enclosed space;

measuring the humidity of the enclosed space;

communicating the measurement of the humidity to a remote location;

comparing the humidity measurement with a pre-selected humidity level;

introducing dry air into the enclosed space if the humidity level equals or exceeds the pre-selected humidity level, until the saturated humidity level is less than the pre-selected humidity level.

2. The method of claim 1, wherein the humidity sensor is provided in fluid communication with the air.

3. The method of claim 1, wherein the humidity sensor is provided in fluid communication with the lubricant.

4. The method of claim 1, wherein the dry air is introduced from an external source.

5. The method of claim 4, further comprising heating the dry air prior to introducing the dry air into the enclosed space.

6. The method of claim 1, wherein the dry air is introduced to the enclosed space by removing air from the enclosed space, drying the air, and returning the dried air to the enclosed space.

7. The method of claim 1, the method further comprising:

measuring temperature simultaneously with the humidity measurement;

calibrating the temperature and humidity measurement to derive a relative humidity measurement of the air.

8. The method of claim 1 wherein the step of introducing dry air into the enclosed space comprises:

withdrawing air from the enclosed space;

compressing the air;

separating the air from water contained in the air;

returning the air to the enclosed space without the water.

9. The method of claim 8 further comprising the step of heating the air prior to returning the air to the enclosed space.

10. The method of claim 8, the method further comprising capturing the water after separating the air from water contained in the air.

11. An apparatus for decreasing the saturated relative humidity of a lubricant contained in an enclosed volume comprising:

a humidity sensor communicatively coupled with the enclosed volume and measuring saturated relative humidity of a lubricant contained in the enclosed volume;

an mechanism for decreasing the humidity of the air in the enclosed volume, thereby decreasing the saturated relative humidity of the lubricant;

a control mechanism at a remote location communicatively coupled with the humidity sensor and the mechanism for decreasing humidity;

wherein the mechanism for decreasing humidity is actuated when signaled by the control mechanism.

12. The apparatus of claim 11, wherein the control mechanism actuates the air/water separating mechanism in response to a humidity sensor reading at or above a pre-determined level.

13. The apparatus of claim 11, the mechanism for decreasing humidity comprising an air/water separating mechanism.

14. The apparatus of claim 13, the air/water separating mechanism further comprising:
   an air compressor coupled with the wet air conduit;
   a high pressure chamber coupled with the air compressor and the dry air conduit;
   a valve coupled with the high pressure chamber.

15. The apparatus of claim 14, wherein the valve is a solenoid valve.

16. The apparatus of claim 14, wherein the valve is communicatively coupled with the control mechanism.

17. The apparatus of claim 11, wherein the control mechanism is a computer.

18. The apparatus of claim 17, wherein the computer is at a remote location.

19. The apparatus of claim 18, wherein the computer is communicatively coupled with the humidity sensor by an internet connection.

20. The apparatus of claim 17, wherein the computer is communicatively coupled with a plurality of humidity sensors.

21. The apparatus of claim 11, the apparatus further comprising a readout communicatively coupled with the humidity sensor to display the measured humidity level.

22. The apparatus of claim 11, the apparatus further comprising a housing to house the control mechanism and the air/water separating mechanism.

23. The apparatus of claim 22, the apparatus further comprising an indicating mechanism carried by the housing and communicatively coupled with the control mechanism.

24. The apparatus of claim 23, wherein the indicating mechanism is an LED display.

25. The apparatus of claim 23, wherein the indicating mechanism is illuminated by the control mechanism in response to the humidity sensor reading at or above the pre-determined level.

26. The apparatus of claim 11, wherein the humidity sensor is in fluid communication with the air.

27. The apparatus of claim 11, wherein the humidity sensor is in fluid communication with the lubricant.

28. The apparatus of claim 11, the apparatus further comprising a temperature sensor communicatively coupled with the enclosed volume and the control mechanism.

29. The apparatus of claim 28, wherein the control mechanism calibrates a reading from the temperature sensor with the humidity reading to derive a temperature calibrated humidity reading.

30. A method of controlling an apparatus for decreasing the saturated relative humidity of a lubricant in an enclosed volume comprising:
   providing a humidity sensor communicatively coupled with the enclosed volume;
   an internet connection;
   providing a communicative coupling between the humidity sensor and the internet connection;
   providing a computer communicatively coupled with the humidity sensor via the internet connection;
   transmitting a reading from the humidity sensor to the computer over the internet;
   using the computer to compare a humidity reading from the humidity sensor to a pre-selected humidity level;
   using the computer via the internet connection to control decreasing the humidity level of the enclosed volume, and the saturated relative humidity of the lubricant in the enclosed volume.

* * * * *